June 4, 1963
M. H. COLLINS ETAL
3,091,918
PARKING METER CONTROL MECHANISM
Filed June 21, 1960
4 Sheets-Sheet 1
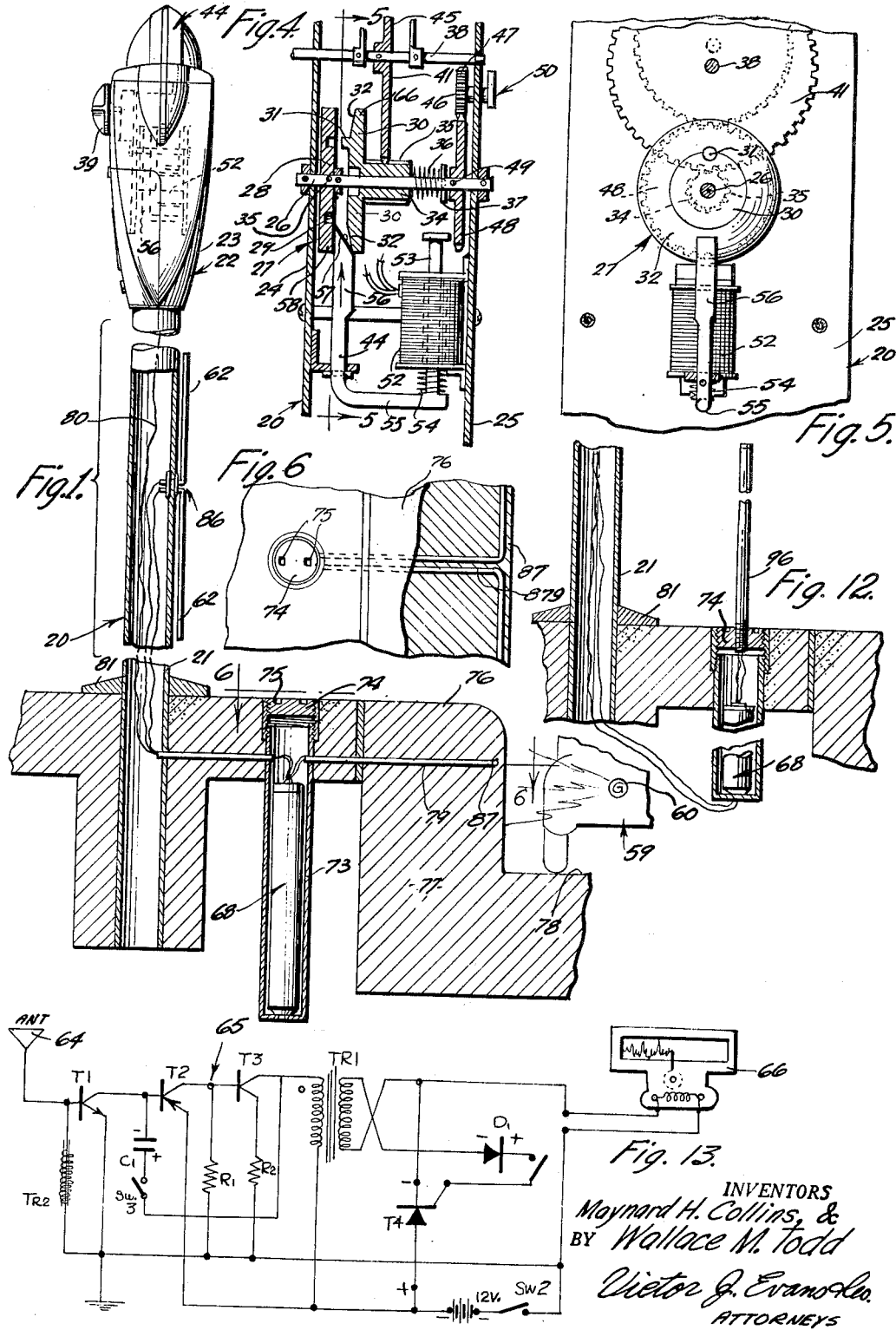
INVENTORS
Maynard H. Collins, &
BY Wallace M. Todd
Victor J. Evans &Co.
ATTORNEYS

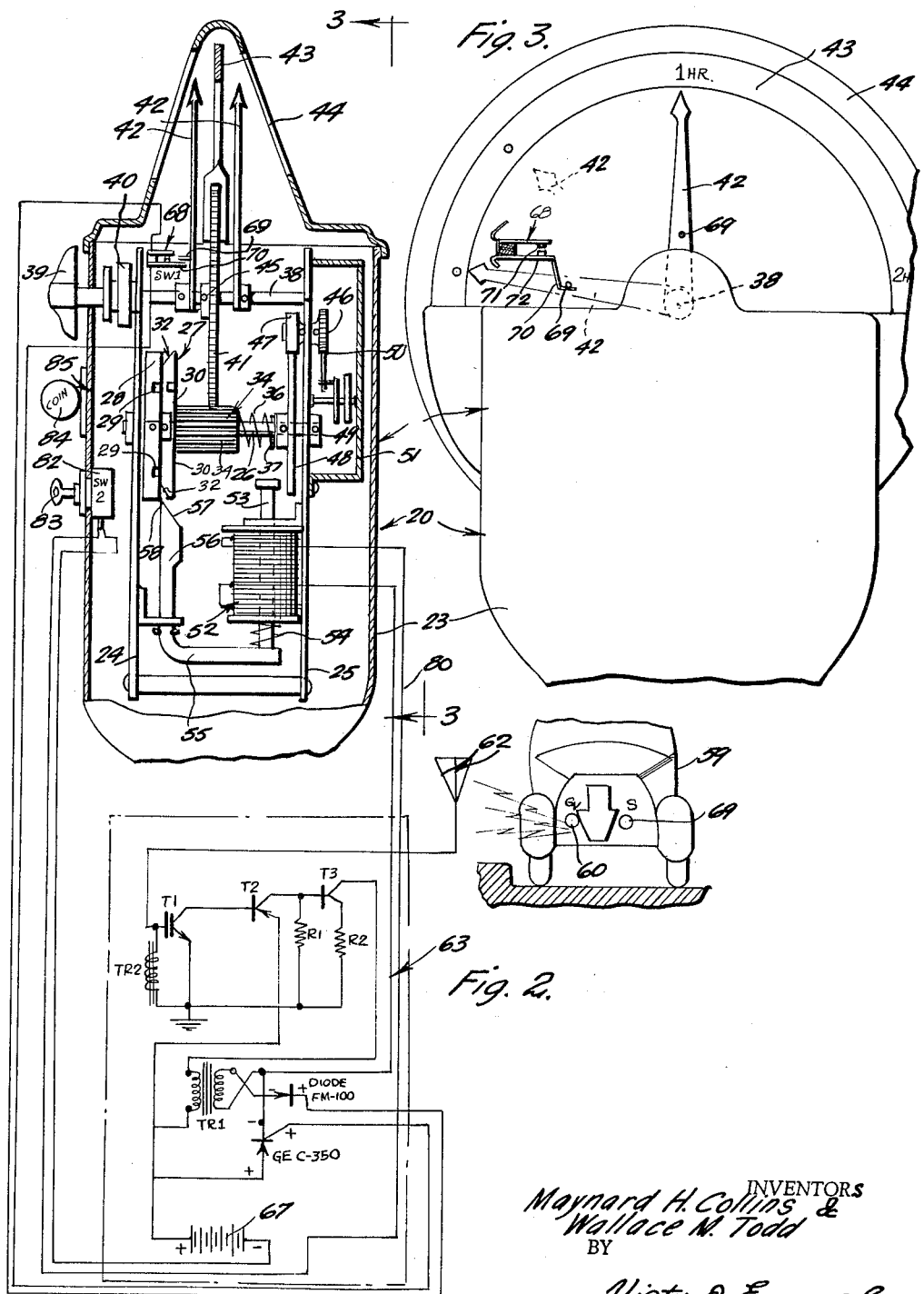

June 4, 1963    M. H. COLLINS ETAL    3,091,918
PARKING METER CONTROL MECHANISM
Filed June 21, 1960    4 Sheets-Sheet 3
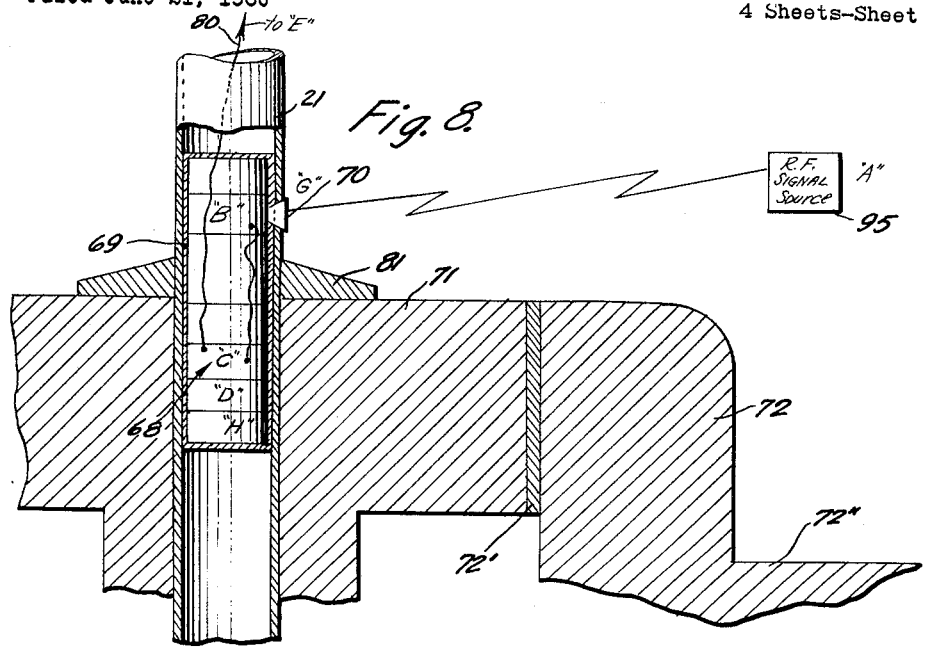
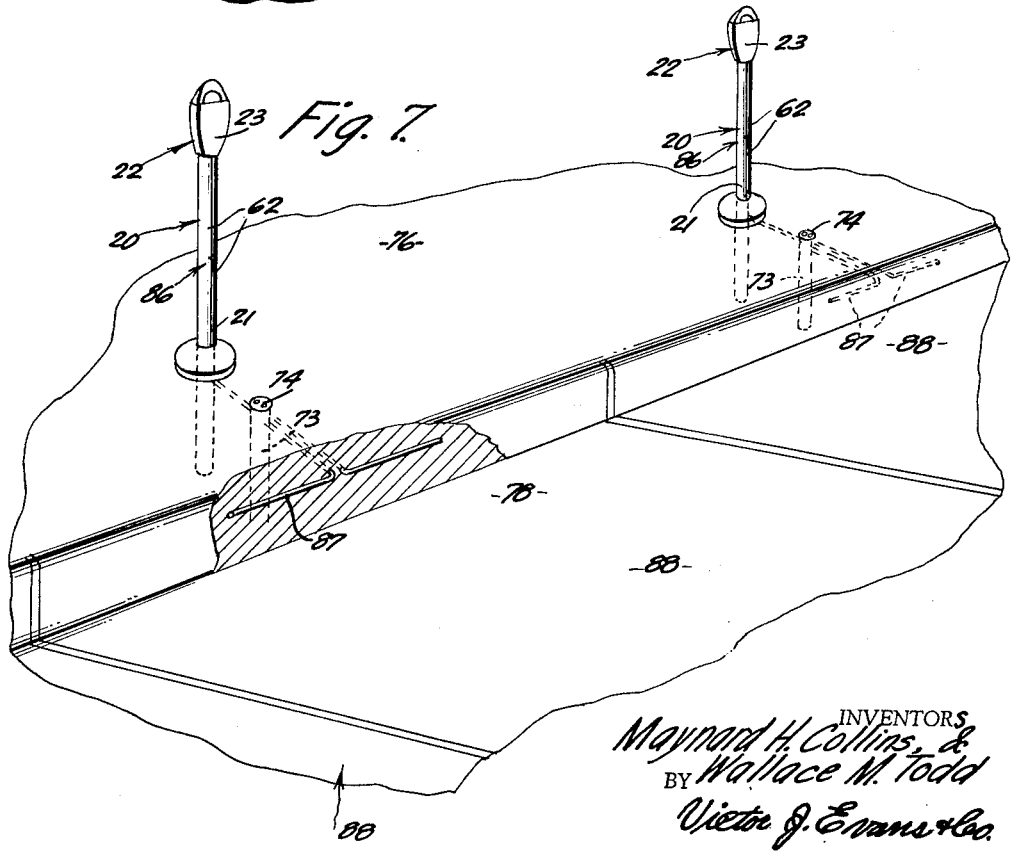
INVENTORS
Maynard H. Collins, &
BY Wallace M. Todd
Victor J. Evans & Co.
ATTORNEYS

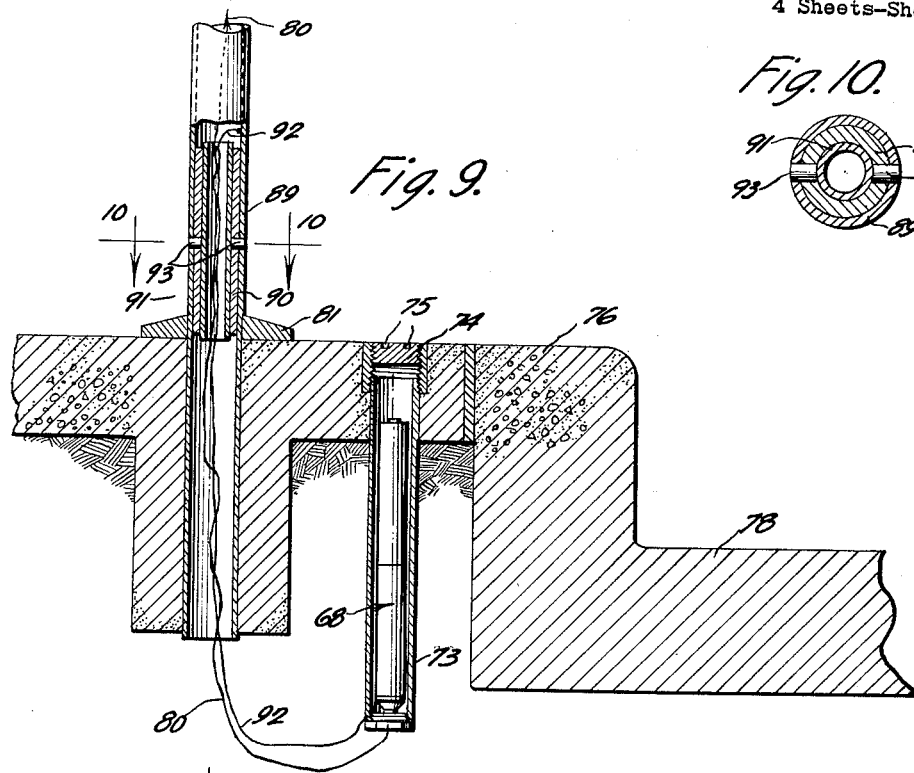
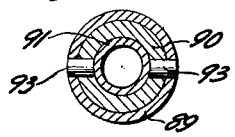
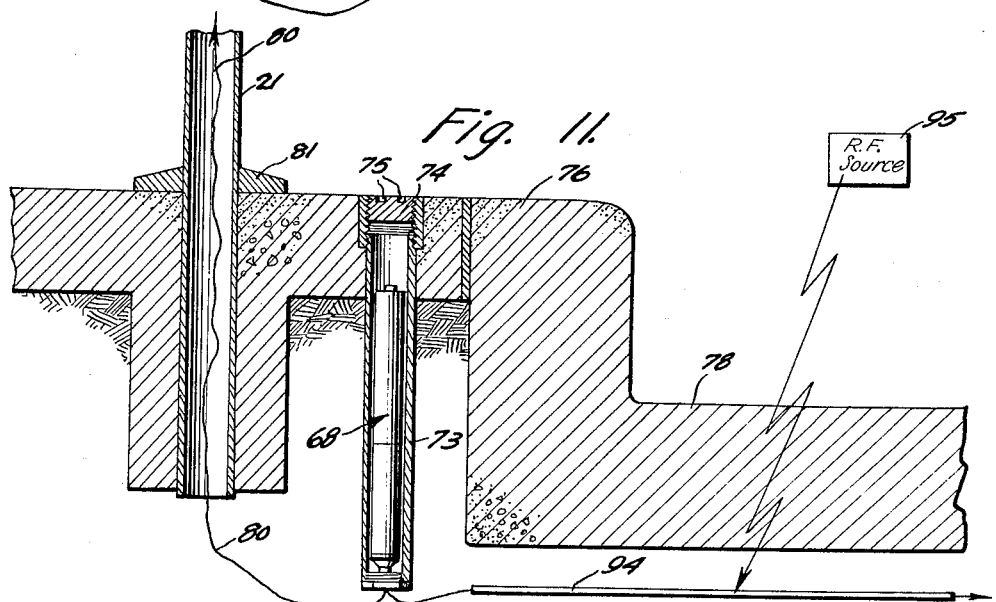

United States Patent Office 3,091,918
Patented June 4, 1963

3,091,918
PARKING METER CONTROL MECHANISM
Maynard H. Collins, 396 25th St., San Bernardino, Calif., and Wallace M. Todd, Rte. 1, Box 558, San Jacinto, Calif.
Filed June 21, 1960, Ser. No. 37,731
1 Claim. (Cl. 58—142)

This invention relates to a parking meter, and more particularly to a means for tripping a parking meter to zero time so as to automatically nullify any time remaining on a parking meter when a vehicle is driven away.

The object of the invention is to provide a means for increasing revenue derived from parking meters wherein according to the present invention the parking meter will be tripped to zero time when a vehicle in a parking space starts the engine to depart so that unused time left on the parking meter will be prevented from being used by another vehicle and wherein according to the present invention there is provided an electronic unit which is self contained and entirely automatic and fool-proof so that the same cannot be tampered with.

A still further object of the present invention is to provide a parking meter trip mechanism which is provided with an electronic unit for picking up signals such as radio frequency energy or signals generated by the vehicle ignition system and starting motor of the vehicle that RF energy which is generated by the vehicle will serve to automatically trip the parking meter to zero time so that when a vehicle is parked by the meter it will be necessary to place another coin in the meter in order to actuate the meter whereby municipalities, cities or the like will derive increased income when using the present invention.

A further object of the invention is to provide a parking meter trip mechanism which is extremely simple and inexpensive to manufacture.

Other objects and advantages will be apparent during the course of the following description.

In the accompanying drawings, forming a part of this application, and in which like numerals are used to designate like parts throughout the same:

FIGURE 1 is a fragmentary elevational view illustrating a parking meter equipped with the automatic trip mechanism of the present invention, and with parts broken away and in section.

FIGURE 2 is an enlarged sectional view, with parts broken away, and illustrating schematically or diagrammatically the principles of the present invention.

FIGURE 3 is a view taken generally on the line 3—3 of FIGURE 2.

FIGURE 4 is a vertical sectional view illustrating the trip mechanism and showing the parts in a different position of that shown in FIGURE 2.

FIGURE 5 is a sectional view taken on the line 5—5 of FIGURE 4.

FIGURE 6 is a sectional view taken on the line 6—6 of FIGURE 1.

FIGURE 7 is a perspective view of the present invention, and with parts broken away and in section.

FIGURE 8 is a fragmentary sectional view illustrating a modification.

FIGURE 9 is a fragmentary sectional view of another modification.

FIGURE 10 is a sectional view taken on the line 10—10 of FIGURE 9.

FIGURE 11 is a fragmentary sectional view of a still further modification.

FIGURE 12 is a fragmentary sectional view of a further modification.

FIGURE 13 is a diagrammatic view of another modification showing a wiring diagram.

Referring in detail to the drawings, and more particularly to FIGURES 1 through 7 of the drawings, the numeral 20 indicates a parking meter which includes a vertically disposed post or hollow standard 21 that has a head 22 on its upper end, and the head 22 includes a hollow housing 23, FIGURES 1 and 2. Arranged in the housing 23 is a framework which embodies vertically disposed spaced parallel brackets or support members 24 and 25, FIGURE 4, and the numeral 26 indicates a shaft which is horizontally disposed, and the shaft 26 is rotatably supported by the brackets 24 and 25. The numeral 27 indicates a clutch which includes a first clutch element or plate 28 that is affixed to the shaft 26, as for example by means of a pin or securing element 33. The plate 28 is provided with recesses 29, for a purpose to be later described.

There is further provided a second clutch element or disc 30 which is freely rotatable on the shaft 26, and the disc 30 is provided with a pin 31 that is adapted to selectively engage one of the recesses 29 of the plate 28. The disc 30 is provided with an outer annular tapered portion 32. The disc 30 further includes a hub 34 which is provided with a plurality of spaced apart teeth 35 on its outer periphery, and a coil spring 36 is circumposed on the shaft 26 and the coil spring 36 has one end abutting a stop member 37, while the other end of the coil spring 36 abutts the hub 34 as shown in the drawings, and the spring 36 serves to normally urge or bias the disc 30 towards the plate 28 and into engagement therewith.

The numeral 38 indicates a second shaft which is rotatably supported by the brackets 24 and 25, and the shaft 38 has a handle or knob 39 on its outer end, FIGURE 2. A main spring 40 is connected to the shaft 38, and a member 41 is suitably affixed to the shaft 38 as for example by means of a securing element 45, and the teeth of the gear member 41 mesh with the teeth 35 of the hub 34. The disc 30 and hub 34 are capable of sliding or longitudinal movement on the shaft 26 as later described in this application, and regardless of the position of the hub on the shaft, the teeth of the gear member 41 will remain in mesh with the teeth 35 due to the elongated formation of the hub 34.

One or more indicators or pointers 42 are affixed to the shaft 38 and these pointers 42 are movable from "zero" position to positions away from the "zero" position and are adapted to coact with the stationary scale 43, and the scale and pointers may be observed through windows such as the windows 44 in the head 22 of the parking meter.

The numeral 46 indicates a third shaft which extends through the bracket 25, and a pinion 47 is mounted on the shaft 46, and the pinion 47 meshes with the teeth of a gear wheel or gear 48, and the gear wheel 48 is affixed to the shaft 26, as for example by means of the securing element 49. An escapement mechanism 50 is operatively connected to the shaft 46, FIGURE 2, and a suitable cover or casing 51 surrounds the escapement mechanism 50.

Arranged in the head is solenoid means consisting in a solenoid 52, and associated with the solenoid 52 is a vertically movable or shiftable plunger 53, which has a coil spring 54 on its lower end, and a finger 56 is connected to the plunger 53 through the medium of a connecting portion 55. The upper end of the finger 56 is beveled as at 57 so as to provide a sharp end portion 58 and the portion 57 is mounted for movement into and out of engagement with the tapered portion 32 of the disc 30.

From the foregoing, it will be seen that there has been provided an automatic trip mechanism for a parking meter wherein any remaining time left on the parking meter when a vehicle drives away will be nullified or returned to zero so that the next vehicle cannot use any of the remaining time without putting an additional coin in the parking meter so that for example additional revenue will be derived from cities, municipalities or the like which are using the parking meters.

With the parts arranged as shown in the drawings, and in particular in FIGURES 1 through 7 of the drawings, it will be seen that when a vehicle such as the vehicle 59 is in the vicinity of the parking meter, when the vehicle 59 is started, the parts such as the generator 60 will have started the motor 61 of the vehicle 59 will give off signals which will be picked up by an antenna such as the antenna 62, and these signals will be transmitted from the antenna 62 to the radio receiving and transmitting mechanism 63. This receiving and transmitting mechanism 63 is electrically coupled or connected to the solenoid 52 so that the solenoid 52 will be actuated whereby the plunger 53 will be moved. Since the plunger 53 has the upstanding finger 56 secured thereto or formed integral therewith, it will be seen that the beveled top portion 57 of the finger 56 can move into engagement with the tapered portion 32 of the disc 30 so that for example the disc 30 of the clutch 27 can be moved away from the plate 28, as for example, the parts can be moved from the position shown in FIGURE 4 to the position shown in FIGURE 2.

The present invention is adapted to use a basic direct coupled transistor receiver which is constructed or arranged so as to receive and amplify noise or static pulses of a random nature. The receiver such as the receiver shown in FIGURE 13 will also receive static pulses at a regular rate and at specific frequencies, and this may be done by a tuned circuit at the input of T1. As shown in the schematic drawing in FIGURE 13, the input is untuned and all static pulses picked up by the antenna such as the antenna 64 are thereby detected and amplified and in this manner all energy generated and in close relation with the antenna is received, while those pulses some distance from the antenna are not received unless they are of a very strong nature and this makes the receiver selective for the use to which it is intended.

The static receiver which is indicated generally by the numeral 65 in FIGURE 13, is also unique in that it is adapted to receive static or noise pulses. To use these pulses for a specific purpose and to use the output of the receiver to actuate a power solenoid such as the solenoid 52 in the parking meter to trip the meter to zero time is the main purpose of the present invention. The receiver however, can also be used in an open highway high speed detector device to check the speed of motor vehicles over a measured course. In addition the receiver can also be used to electronically check the number of vehicles that pass a given check point.

Furthermore, in addition to actuating power solenoids which will carry currents up to 15 amperes, it may also be used to turn on motors, actuate garage doors by remote control and a variety of other uses, and it is designed for minimum cost and can be made in miniature size as for example the receiver can be made so that it has a small size such as the size of a cigarette package and the unit can be made completely portable if necessary. The receiver has a built in timing device independent of the reception of static pulses, which gives timing pulses comparable to any other timing source.

The sequence of operation is as follows. Electromagnetic energy picked up by the antenna 64, which can be a straight wire, dipole or loopstick, is put across TR2, which is a standard broadcast loopstick coil with a ferric oxide core. This untuned circuit feeds the signal to the base of T1. All static and noise pulses are amplitude modulated and due to the detecting properties of the transistors, the signal is detected and amplified and the collector output is fed directly into the base of T2. The signal is further amplified and the collector output of T2 is fed directly into the base of T3. The large signal output of T3 is now transformer coupled to the gate of the GE C–35U controlled rectifier, first being rectified by the diode D1.

When SW2 is closed, the 12-volt power supply, the power solenoid and T4 are in series and the 12-volt of the power supply is impressed across T4. In the absence of any voltage across the gate of T4, no current flows in this series circuit. Any signal received by the antenna as described will be amplified, rectified, transformer coupled, rectified and impressed across the gate. This small current across the gate of T4 will make this regenerative switch T4 break down and an effective short circuit across T4 will handle up to 15 amperes of current and it is limited only by the resistance of this series circuit. The action of SW1 and SW2 is described in operation of the parking meter.

R2 is a limiting resistor and R1 is the sensitivity control and this can be either fixed or variable. When SW3 is closed the action of C1 creates a pulse in the output of the receiver. The time duration of the pulse and time between pulses can be controlled by the capacity of C1. A value of 400 mfd. gives time between pulses of 20 seconds, while 4 mfd. gives one second.

In the absence of a signal to the base of T1 and with SW3 closed, C1 will charge through T1 to a maximum value. This heavy surge of current will be amplified by T2 and T3 and will appear across the output of TR1. When a signal is received by the base of T1 with SW3 closed, C1 will begin to charge and the combined amplified T1 and the charge of C1 will give a greater output than the charge of C1 alone. With SW3 open no time pulse is generated and the received signal is amplified by the three direct coupled transistors in a normal manner. The output across TR1 is less because the effective amplification of the receiver of the charging of C1 is not obtained.

It is to be understood that various modifications of this circuit can be provided for that will perform several different functions. For example by substituting a graph machine such as the graph machine 66 shown in FIGURE 13 for the power solenoid 52, timing pulses of any duration can be obtained and signals received may be timed to tenths of a second. In addition, an electronic counter can be used to count up to 600 per minute and the like, and it is believed that this circuit embodies certain unique and unusual features.

Thus, FIGURE 13 is a schematic illustration of a static RF unit and controlled rectified solenoid tripping circuit.

In FIGURE 2 a different or alternative circuit is illustrated from that shown in FIGURE 13, and in FIGURE 2 the numeral 63 indicates generally the solenoid tripping circuit and the numeral 67 indicates a power supply which may be mercury cells of a suitable capacity or type. The circuit 63 is electrically coupled to the solenoid 52 so that the unit or circuit 63 will supply an A.C. output from the RF and AF unit 63 to the solenoid 52, and the solenoid 52 is arranged in the meter head or mechanism while the RF and AF unit 63 may be arranged at a different location as desired.

The present invention is foolproof and positive in its action and can be incorporated in parking meters of existing designs and with the present invention the minimum amount of disruption to facilities such as curbs, streets, or the like is required when installing the mechanism. As shown in FIGURE 8 for example, the electronic component as indicated by the numeral 68 may be conveniently placed in a tube 69 which may be made of fiberglass or the like and thus the component 58 can be sealed from adverse weather conditions or the like and the entire tube 69 with the unit 68 therein can then be conveniently positioned in the standard or post 21 of the parking meter and an antenna or microphone pickup unit 70 may also be arranged as shown in FIGURE 8 for picking up the signals from the vehicle. In FIGURE 8 the numeral 71 indicates a portion of a sidewalk or other surface, while the numeral 72 indicates a section of a curb and the numeral 72″ indicates a portion of the street or gutter. The usual expansion joint 72′ may be provided wherever desired or required, as for example between the sidewalk 71 and the curb 72. Thus, with this arrangement it will not be necessary to have other wires or attachments in the street and the device will be tripped by the interference created when the starter or generator of the vehicle is actuated or started, and the mechanism is adjustable and highly sensitive so that it can be adjusted to operate at such a close range that the vehicles passing or parking next to the other meter will not trip the meter back to zero. In addition, the mechanism is ruggedly constructed so that jars, noises from radios or television sets, vibrations and the like will not accidentally trip the mechanism.

There are various alternative ways of accomplishing the same purpose according to the present invention. The mechanism embodies or includes an electronic device which can be inserted into the post of an ordinary parking meter so that when the vehicle such as an automobile drives out or in the meter automatically trips back to zero and this has the practical effect of increasing income to cities or municipalities as for example such income will be increased by approximately sixty percent for the same amount of time. Thus, according to the present invention a parking meter will be tripped to zero time when the vehicle in a parking space starts the engine to depart and this serves to prevent unused time left on a parking meter from being used by another vehicle. The electronic circuitry or unit may be installed in a sealed, heat insulated, fiberglass tube such as the tube 69 in the meter post 21 and the unit 68 in the tube 69 is self contained, wholly automatic and foolproof from tampering and the unit may be transistorized.

The signal source used to energize the electronic unit in the meter post is radio frequency energy generated by the ignition system and the starting motor of the vehicle. Broad frequencies at .5 mcs. and 27.5 mcs. are the most useful, while other frequencies in radio spectrum are available. The sensitivity and range of the unit can be varied from a few inches to several feet from the post and the unit is directional and shielded by the meter post from practically all interference. Existing meters such as Duncan-Miller parking meters may be modified to trip to zero time as previously stated and in use, energy generated is received by the high "Q" ferric oxide loopstick B from the signal source A, FIGURE 8, and the loopstick may be installed directly behind the non-metallic port or pickup unit G which is indicated by the numeral 70. Energy received by the unit B goes by shielded line to the unit C, and the unit C is a miniature RF amplifier, detector and audio amplifier which can be of any suitable design. Basically, unit C is a radio receiver designed to receive damped mcw. radio waves. Unit C supplies for example fifty microamperes of output to unit D and the unit D which is a sensitive D.C. amplifier, rectifies, filters and amplifies the signal to operate a D.C. relay, whose normally open contacts close to furnish a pulse of current to unit E in the parking meter. Unit E may be a power solenoid such as the solenoid 52 with a pusher type armature mounted on the meter mechanism so that the knife edge 57 of the armature shaft will be forced between the elements 30 and 28 of the spring release clutch of the clock mechanism. Spring tension of the parking meter clock is released, so as to bring the entire parking meter mechanism to zero time. The clutch unit 27 is mounted in the timing clock portion of the meter. The power source in FIGURE 8 is indicated by the letter H and corresponds to the numeral 67 in FIGURE 2 and may be of the mercury type battery which supplies power for the entire installation. In FIGURES 2 and 3 the numeral 68 indicates an on and off switch which is operated by the meter mechanism. When the park meter is put into operation, the switch 68 closes to furnish power to all units, and when the meter trips to zero, the switch 68 opens so as to cut the power to all units. The switch 58 is opened as for example by means of a pin or lug 69 or a pointer 42, and the pin 69 may engage an extension 70 which has a contact 72 that is adapted to electrically engage the contact such as the contact 71.

An important aspect of the present invention is the use of RF energy generated as previously described to operate a parking meter and to trip a parking meter to zero time. The electronic units are combined for the specific purpose previously stated. Certain of the units serve to release the spring tension of the timing clock.

In FIGURE 1 the numeral 73 indicates a tube which is spaced from the post 21, and the tube 73 may have the electronic mechanism or unit 68 therein, and a removable plug 74 is arranged above the tube 73, so that when it is desired to gain access to the unit 68, the plug 74 can be removed as for example a suitable tool can be arranged in engagement with recesses 75 in the plug 74, FIGURE 1. Also in FIGURE 1 the numeral 79 indicates a dipole installed in the curb, and the numeral 62 indicates the dipole antenna on the meter post 21. A cable 80 extends from the unit 68 to the power solenoid 52 in the parking meter head. The numeral 76 indicates the sidewalk level, and the numeral 77 indicates the curb, while the numeral 78 indicates the street or gutter level. The numeral 81 indicates the meter base, and as previously stated there is provided the tripping clutch 27, and there is also provided micro switches such as the switches 68 and 82. The switch 82 may be operated by a key 83, FIGURE 2, and in FIGURE 2 the numeral 84 indicates a coin which is adapted to be inserted in the slotted portion 85 of the parking meter mechanism.

Thus, it will be seen that there has been provided an electronic mechanism for tripping parking meters to zero time so as to prevent motor vehicles from using parking spaces without paying for the same and the present invention is arranged and constructed so that it can be made a part of standard parking meters without altering parking meters now in use and the electronic mechanism can also be installed without disturbing or cutting the street or parking spaces and the mechanism with the exception of the tripping device is entirely electronic and the electronic equipment may be transistorized and standard electronic parts may be utilized. A magnetic field generator around the engine compartment of all motor vehicles is generated by the starting motor of the vehicle and by the ignition system of the vehicle. This radio frequency electro-magnetic field fills the entire radio frequency spectrum. Some radio frequencies are stronger than others, but all motor vehicles generate certain specific frequencies. These specific freqeuncies are now used to actuate the electronic device set forth. Frequencies of 1600 kilocycles and 20 to 40 megacycles have been successfully used in the present invention.

Several types of antenna systems can be used to pick up energy from the electro-magnetic field generated. The dipole and loopstick are believed to be the most efficient. The dipole such as the dipole 79 in FIGURE 1 is installed in the curb horizontal with the gutter. With the directional properties of the dipole, motor vehicles that are adjacent to the parking space occupied have no effect on the parking meter in use. The dipole may also be installed on the meter post where directional properties are not desired. The loopstick can be used in the same manner as the dipole but the directional properties are not as pronounced.

The operation of the electronic zero tripping device is as follows. The electromagnetic energy generated by the motor vehicle induces radio frequency currents in the antenna installed in the curb at the points 86 and 87. These currents are routed to the electronic unit 68 and this unit contains the transistorized RF detector and the amplifier and the battery power supply which powers the entire equipment. Amplified currents from unit A now are routed by the cable 80 through the base of the meter post and to the parking meter solenoid 52 and this solenoid receives the energy pulse and pulls the plunger 53 into itself. The plunger 53 causes the portion 57 to be moved into the tripping clutch 27 so as to force the segments 30 and 28 apart. The spring tension of the entire meter mechanism is released and the parking meter is automatically set to zero time. This does not interfere with the normal operation of the parking meter. The electronic tripping device could be inoperative and the parking meter would still operate in a normal manner.

In actual practice, money such as the money or coins 84 inserted into the meter permits the handle 39 to be turned to the right, and the micro-switch 68 which is attached to the meter mechanism opens. Energy generated by closing the micro-switch 82 is prevented from tripping the meter by previous opening of the switch 68. The switch 82 turns on all the equipment. When the handle 39 is released, the switch 68 closes and the mechanism is ready to be tripped by energy from a motor vehicle in the parking space.

In FIGURE 7 the numeral 88 indicates diagonal parking spaces, which are arranged in a road or street surface. In FIGURE 7 there is illustrated a standard installation dipole antenna and meters.

Referring to FIGURES 9 and 10 of the drawings, there is shown a further modification wherein the meter post such as the meter post 89 is used as an antenna and in FIGURES 9 and 10 an insulated sleeve 91 is arranged in a support member 90, and the electronic unit 68 may be coupled to the post 89 as for example by means of a wire or conductor 92. Pins 93 are provided for maintaining the parts in their proper assembled relation. In the modification of FIGURE 11, the dipole or antenna 94 may be arranged below the curb or street so that signals from the RF source 95 may be picked up and transmitted to the electronic unit 68 whereby the cable 80 can then supply electrical energy to actuate the power solenoid as previously described. In the modification of FIGURE 12, an antenna or loopstick 96 may be connected to the plug 74 so that the signals can then be transmitted to the electronic unit 68 in order to actuate the power solenoid which is arranged in the parking meter head.

In FIGURE 2, it will be seen that the clock spring 40 is attached to the shaft 38 which drives the gear 41 and the gear 41 in turn drives the gear 35. The gear 35 and one segment 30 of the clutch are made integral or in one part and the gear or hub 35 is free to revolve around the shaft 26. The other part or segment 28 of the clutch is pinned to the shaft 26 as at 33 and this shaft 26 in turn drives the entire clock mechanism through the gear 48. When the knife edge 57 of the solenoid shaft is forced between the two segments of the clutch, the clutch segment 30 is forced away from the segment 28, and this allows gear 35 to revolve with gear 41 and in turn allows the clutch spring 40 attached to the shaft 38 to unwind to meter stop bring the entire parking mechanism to zero time.

When the parking meter is put in operation, the spring 36 forces the clutch segment 30 against the clutch element 28 so as to allow the pin 31 of the clutch segment 30 to engage the hole 29 in the clutch segment 28. Holes 29 in the face of the clutch segment 28 are ninety degrees apart and readily engaged with the pin 31. The clutch is simple and positive and remains engaged until forced apart by the shaft or member 56.

Thus, it will be seen that there has been provided a mechanism for automatically nullifying any residue of time remaining on the meter when a vehicle parks in a parking zone adjacent thereto is driven from the zone and the present invention can be used on different types of parking meters and the parts are constructed or arranged so that they will not readily get out of order as for example in adverse conditions, vibrations, or the like and the mechanism is tamper proof. The mechanism is positive in action, accurate, and ruggedly and simply constructed and can be adjusted as desired.

Minor changes in shape, size and rearrangement of details coming within the field of invention claimed may be resorted to in actual practice, if desired.

What is claimed is:

In a parking meter for a motor vehicle, the meter including an indicator swingable from a "zero" position to a position away from the "zero" position, spring means operatively connected to said indicator and biasing said indicator to the "zero" position, hand actuable means operatively connected to said indicator for moving it away from the "zero" position, and a clock escapement mechanism, a clutch including a first clutch element operatively connected to said mechanism and a second clutch element operatively connected to said indicator and movable into and out of engagement with said first clutch element, spring means operatively connected to said second element and biasing said second element into engagement with said first element, solenoid means engageable with said second clutch element and operable when actuated to move said second clutch element to the out of engagement position, radiant energy receiving means in circuit with said solenoid means and a source of electrical energy, said receiving means being operable to actuate said solenoid means responsive to the reception of radiant energy generated by an electrical circuit of a motor vehicle parked adjacent said meter, and a switch in circuit with said receiving means, source of energy, and said solenoid means, said switch being operable to closed position responsive to movement of said indicator to the away from "zero" position and operable to open position responsive to movement of said indicator to "zero" position.

References Cited in the file of this patent

UNITED STATES PATENTS

| | | |
|---|---|---|
| 823,682 | Hahl | June 19, 1906 |
| 2,223,843 | Burley | Dec. 3, 1940 |
| 2,229,183 | Mitchell | Jan. 21, 1941 |
| 2,652,551 | Gumpertz et al. | Sept. 15, 1953 |
| 2,656,908 | Ellison | Oct. 27, 1953 |
| 2,809,735 | Hand | Oct. 15, 1957 |
| 2,821,283 | Cruse | Jan. 28, 1958 |
| 2,945,341 | Griffin et al. | July 19, 1960 |